US005828312A

United States Patent [19]

Yamazaki

[11] Patent Number: 5,828,312

[45] Date of Patent: Oct. 27, 1998

[54] REMINDER APPARATUS AND METHOD

[75] Inventor: Yasuyuki Yamazaki, Shizuoka, Japan

[73] Assignee: NEC Corporation, Tokyo, Japan

[21] Appl. No.: 680,229

[22] Filed: Jul. 11, 1996

[30] Foreign Application Priority Data

Jul. 13, 1995 [JP] Japan .................................... 7-177025

[51] Int. Cl.[6] ........................................ H04Q 1/00

[52] U.S. Cl. ................................ 340/825.44; 340/825.46; 340/825.48

[58] Field of Search ......................... 340/825.44, 825.46, 340/825.48

[56] References Cited

U.S. PATENT DOCUMENTS

| | | | |
|---|---|---|---|
| 4,438,433 | 3/1984 | Smoot | 340/825.44 |
| 5,012,219 | 4/1991 | Henry | 340/825.44 |
| 5,332,994 | 7/1994 | Kawashima | 340/825.44 |
| 5,394,140 | 2/1995 | Wong | 340/825.44 |

FOREIGN PATENT DOCUMENTS

| | | | |
|---|---|---|---|
| 318136 | 1/1991 | Japan . | |
| 2 028 548 | 8/1979 | United Kingdom . | |
| WO 98/06478 | 7/1989 | WIPO | 340/825.44 |

*Primary Examiner*—Brian Zimmerman
*Attorney, Agent, or Firm*—Whitham,Curtis & Whitham

[57] ABSTRACT

An apparatus for notifying a user of information by using sound or silent medium includes a scheduler which determines an alarm time by the user's operation and a selector which selects a single mode from a sound mode and a silent mode comprising a beep silent mode, a modified silent mode, and a fully silent mode. The sound mode uses at least the sound medium to notify the user of the information, and the silent mode uses the silent medium to notify the user of the information. When either the sound mode or the beep silent mode has been selected, the apparatus makes a beep reminder at the alarm time. When the modified silent mode has been selected, the sound reminder is made at a time when a selection of the silent mode is reset after the alarm time has passed. When the fully silent mode has been selected, a silent reminder such as a visual or a vibration reminder is made at the alarm time.

19 Claims, 3 Drawing Sheets

REMINDER APPARATUS AND METHOD

BACKGROUND OF THE INVENTION

1. Field of the Invention

The present invention relates to a reminder apparatus having a scheduler function, and more particularly to a method and apparatus of reminding a user of a schedule by a sound, a visual or a vibration reminder.

2. Description of the Related Art

A selective calling receiver has been widely used for various purposes and, especially, a small-sized and light-weight selective calling receiver called a pager is suitable for being taken on the road. A basic function of the selective calling receiver is to indicate by beep sound, vibration, or light the incoming call. Since the beep is a nuisance to others, either a beep mode or a silent mode can be selected by the user operating a mode selector depending on surroundings. Further, in order to match the convenience of portability, many selective calling receivers have been provided with a scheduler program and an alarm function which makes a beep or a visual reminder to remind the user of a meeting or other events, as disclosed in Japanese Patent Laid-open Publication No. 3-18136.

Since an alarm is generally important to the user, it is necessary to attract the attention of the user who may forget the appointment. For that purpose, a beep reminder is most effective. Therefore, the conventional selective calling receiver is generally designed to make a beep alarm even in the silent mode. However, as described above, it is true in some cases that the beep is a nuisance to others.

SUMMARY OF TETE INVENTION

The present invention has been proposed in order to overcome the aforementioned problems inevitably inherent in the prior art.

Accordingly, it is an object of the present invention to provide an apparatus and method for reminding a user of a schedule with reliability.

It is another object of the present invention to provide a selective calling receiver for notifying the user of an alarm time with reliability even when a silent mode has been selected.

In accordance with a first aspect of the present invention, an apparatus for notifying a user of information by using at least one of a sound medium and a silent medium is provided with a scheduler which determines an alarm time and a selector which selects a single mode from a sound mode and a silent mode comprising a first silent mode, a second silent mode, and a third silent mode. The sound mode uses at least the sound medium to notify the information to the user, and the silent mode uses the silent medium to notify the information to the user. The apparatus makes a sound reminder at the alarm time when either the sound mode or the first silent mode has been selected. When the second silent mode has been selected, the sound reminder is made at a time when a selection of the silent mode is reset after the alarm time has passed. And, when the third silent mode has been selected, a silent reminder is made at the alarm time.

In accordance with a second aspect of the present invention, a selective calling receiver comprises a receiver which receives a selective calling signal and detects an incoming call and a scheduler which determines an alarm time. The selective calling receiver is further comprises a selector which selects a single mode from a sound mode and a silent mode comprising a first silent mode, a second silent mode, and a third silent mode. The sound mode uses at least the sound medium to notify the incoming call to the user, and the silent mode uses the silent medium to notify the incoming call to the user. When either the sound mode or the first silent mode has been selected, a sound reminder is generated at the alarm time. When the second silent mode has been selected, the sound reminder is generated at a time when a selection of the silent mode is reset after the alarm time has passed. And when the third silent mode has been selected, a silent reminder is generated at the alarm time.

According to a method for notifying a user of information by using at least one of a sound medium and a silent medium, after determining an alarm time by a scheduler program, a silent mode is selected in which the silent medium is used to notify the information to the user. And then a sound reminder is generated at a time when a selection of the silent mode is reset after the alarm time has passed.

The above and other objects and advantages of the present invention will become apparent from the following detailed description when read in conjunction with the accompanying drawings.

DETAILED DESCRIPTION OF THE PREFERRED EMBODIMENTS

Figure 1:
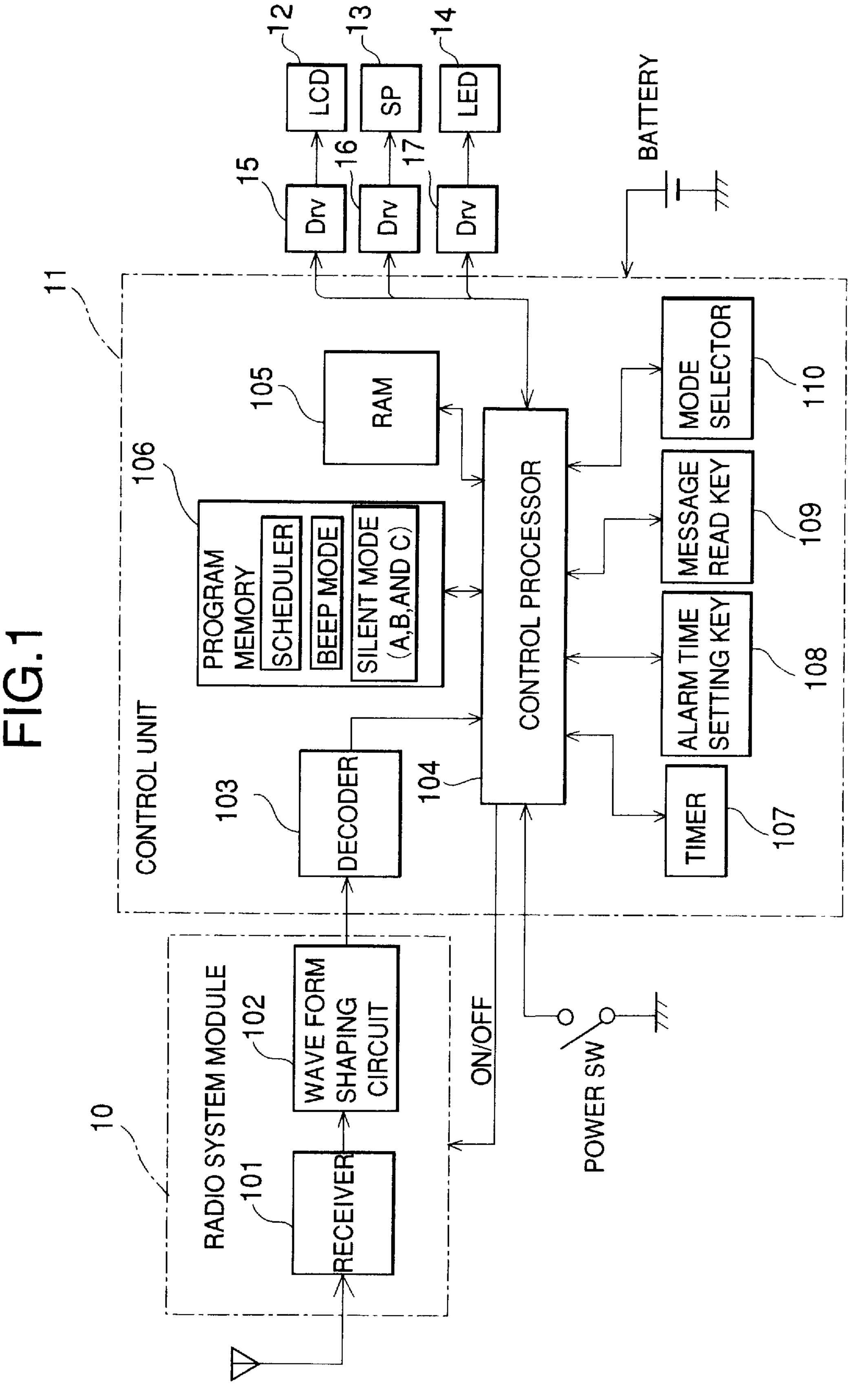
FIG. 1 is a functional block diagram showing a selective calling receiver employing an embodiment according to the present invention.

Referring to FIG. 1, there is shown a selective calling receiver in accordance with the present invention. The selective calling receiver comprising a radio system module 10 and a control unit 11 which is connected to a battery, a power switch, and an informer. The informer is comprised of a liquid-crystal display (LCD) 12, a speaker 13, and a light-emitting diode (LED) 14 which are connected to the controller 11 through an LCD driver 15, a speaker driver 16, and an LED driver 17, respectively. The radio system module 10 comprises a built-in antenna, a receiver 101, and a waveform shaping circuit 102. The receiver 101 receives a radio signal from a base station (not shown) of a paging system through the antenna. The receiver 101 further includes a demodulator which demodulates the received radio signal into a baseband signal. The waveform shaping circuit 102 shapes the waveform of the baseband signal and the wave-shaped signal is transferred as a selective calling signal from the radio system module 10 to the control unit 11.

The control unit 11 comprises a decoder 103, a processor 104, a random access memory 105, a program memory 106, a timer 107, and other necessary circuits. The control unit 11 is further provided with an alarm time setting key 108, a message read key 109, and a mode selector 110. The decoder 103 decodes the selective calling signal received from the radio system module 10 and outputs received data to the processor 104. The processor 104 performs the receiving control according to a main program previously stored in the program memory 106. In addition to the main program, the program memory 106 further stores a scheduler as well as a beep mode and a silent mode programs one of which is selected by the user operating the mode selector 110. The silent mode program, as described later, includes three mode programs A, B, and C, one of which is designated by the user using the mode selector 110.

Further, as known well, the processor 104 outputs an intermittent ON/OFF control signal to the radio system module 10 so as to perform an intermittent receiving operation. Furthermore, in the case of the beep mode, the processor 104 activates the speaker 13 and the LED 14 to inform the user of incoming call by beep sound and blinking light when a selective calling number included in the received data is identical to the ID number of its own previously stored in an ID memory (not shown). However, in the case where the silent mode is selected, the processor 104 causes the speaker 13 not to be activated but the LCD 12 or the LED 14 to be activated when the incoming call has occurred. When the selective calling number is identical to the ID number of its own, the processor 104 causes the memory 105 to store the received message and then the received message is displayed on the LCD 12 by the user operating the message read key 109.

In addition to the receiving operations as mentioned above, the control unit 11 has an alarm function which makes a beep or a visual reminder when an alarm time previously set by the user is reached. The user can set the scheduler to appointment times by operating the alarm time setting key 108. In the scheduler program, when the timer 107 reaches the set alarm time, the processor 104 activates the speaker 13 to make a beep reminder in the beep silent mode A, and activates the LCD 12 or the LED 14 to make a visual reminder in the fully silent mode C. Further, in the case where the modified silent mode B is designated, the processor 104 activates the speaker 13 to make a beep reminder when the alarm time has passed away and then the silent mode is reset by the user operating the mode selector 110. Such an alarm function will be described in detail hereinafter.

Figure 2:
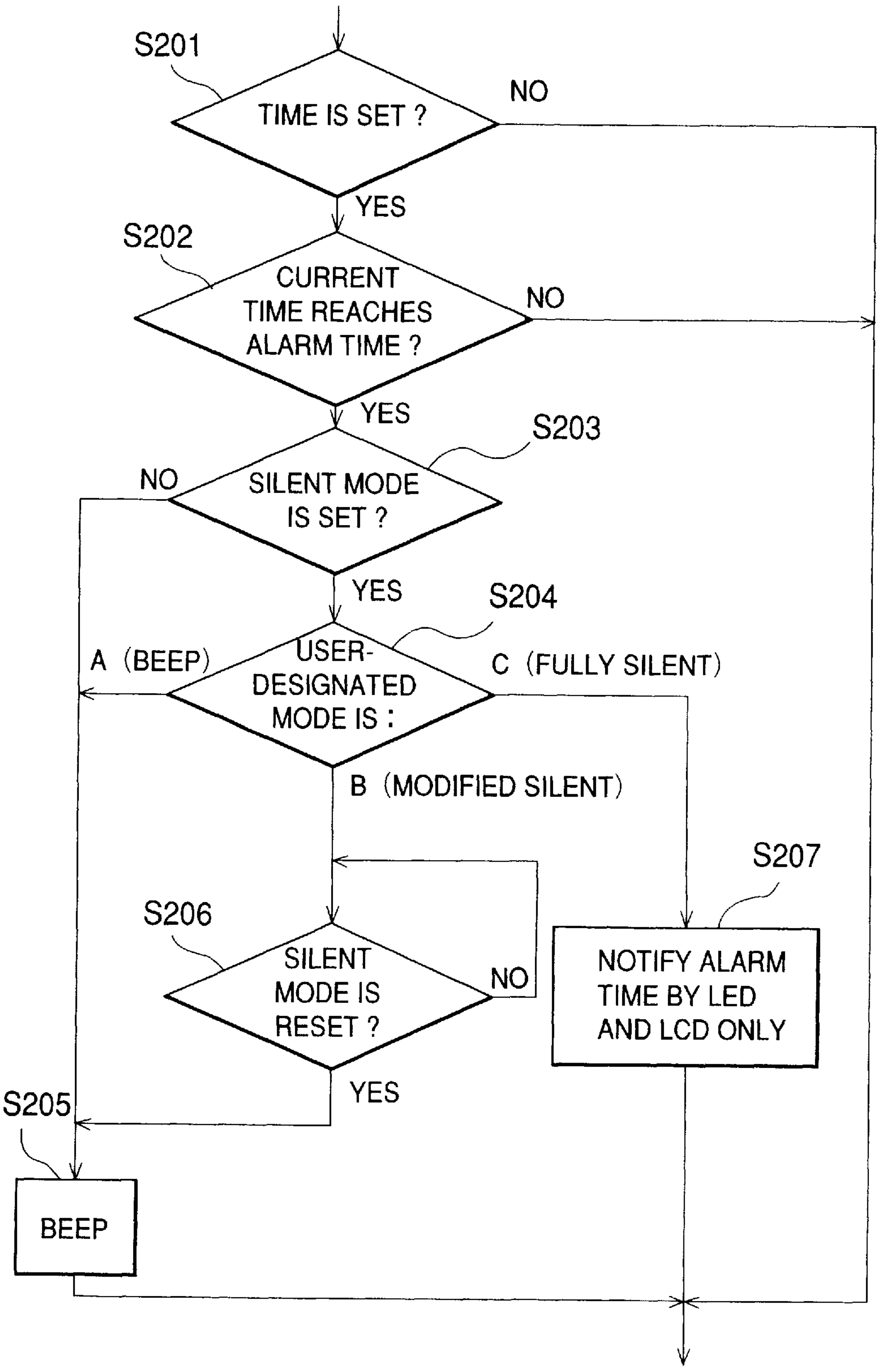
FIG. 2 is a flowchart showing an alarm notifying operation of the selective calling receiver employing the embodiment.
Figure 3:
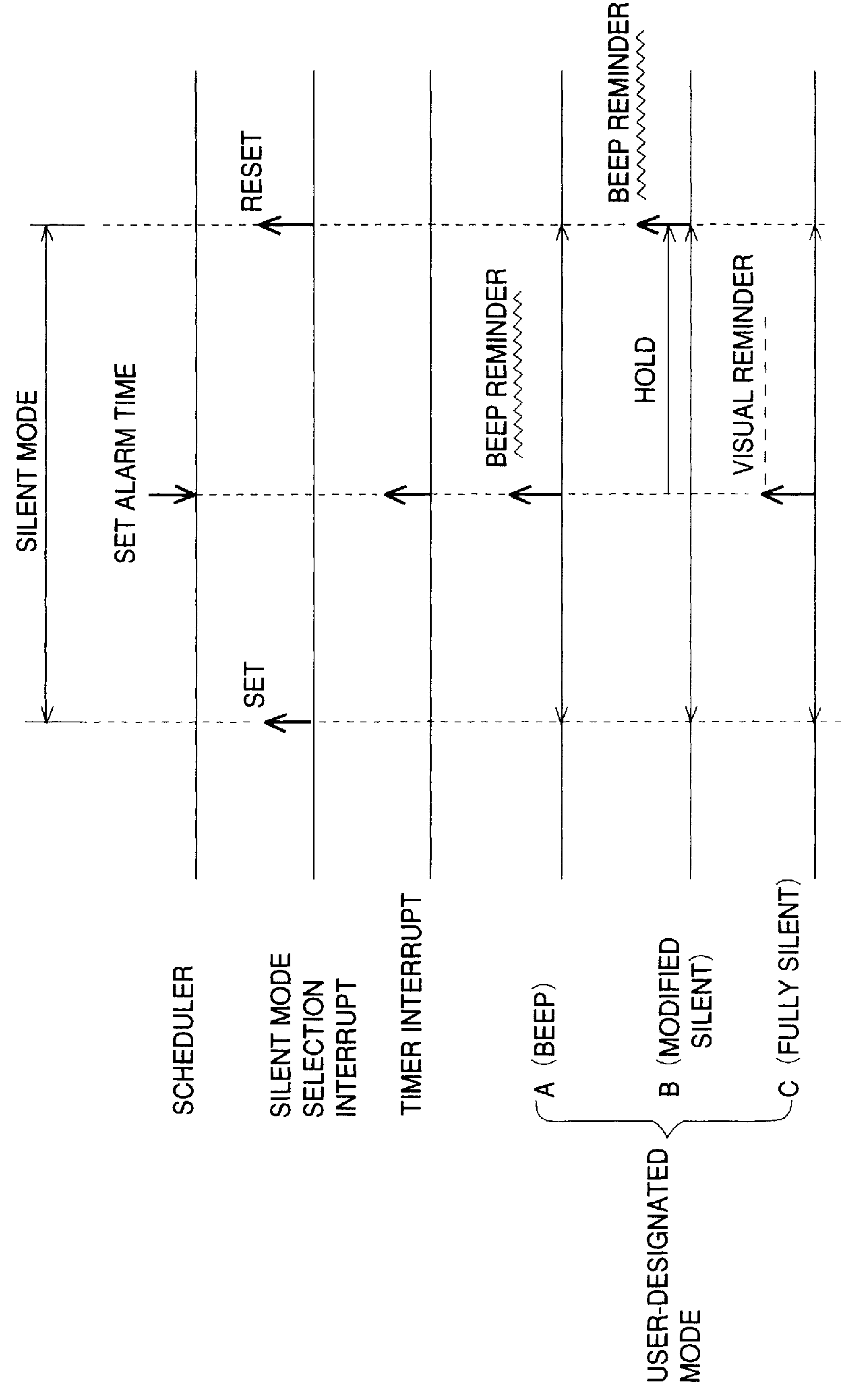
FIG. 3 is a timing chart showing the alarm notifying operation of the selective calling receiver employing the embodiment.

Referring to FIGS. 2 and 3, in the case where the user has set the timer 107 to an alarm time through the scheduler program by operating the alarm time setting key 108 (YES in step S201), the processor 104 is informed of the current time reaching the set alarm time by the interrupt of the timer 107 (YES in step S202). When the alarm time is reached, the processor 104 checks the mode selector 110 whether the silent mode is set (step S203). When the silent mode is set (YES in step S203), it is further checked which silent mode is designated, the beep silent mode A, the modified silent mode B, or the fully silent mode C (S204).

In the case where the beep silent mode A has been designated, the processor 104 controls the speaker driver 16 such that the speaker 13 makes a beep reminder to remind the user of a meeting or other events (step S205). The time of day at that time may be displayed on the LCD 12. Since the receiver operates in the silent mode, needless to say, the user is informed of the incoming call by only a visual informer such as the LCD 12 or the LED 14.

When the modified silent mode B has been designated, the processor 104 transfers control to the main program without reminding the user of the alarm time until the silent mode is reset by the user operating the mode selector 110 (step S206). At the time when the silent mode reset interrupt occurs, the processor 104 controls the speaker driver 16 such that the speaker 13 makes a beep reminder to remind the user of a meeting or other events (step S205). The time of day at that time may be displayed on the LCD 12.

In the case of the fully silent mode designated, the user is informed of the current time reaching the set alarm time by only a silent informer such as the LCD 12 or the LED 14 (step S207). More specifically, the processor 104 controls the LCD driver 15 and the LED driver 17 so that the set alarm time is displayed on the LCD 12 and the LED 14 blinks to remind the user of an appointment or the like. The silent informer may include a vibrator in addition to a visual informer such as the LCD 12 and the LED 14.

As shown in FIG. 3, even when the selective calling receiver is set to the silent mode which is to inform the user of the incoming call by the visual informer only, the selective calling receiver can inform the user of the set alarm time to remind the user of the appointment according to a desired silent mode designated by the user himself. As described above, a beep reminder is made at the set alarm time when the user has designated the beep silent mode A, a beep reminder is made at the time when the silent mode is reset in the case of the modified silent mode B, and a visual reminder is made at the set alarm time when the user has designated the fully silent mode C.

What is claimed is:

1. An apparatus for generating a reminder alarm in a selective call receiver which is selectively set to one of a sound mode and a silent mode, wherein an incoming call causes a sound medium incoming call alarm to be generated when the sound mode is selected and a silent medium incoming call alarm to be generated when the silent mode is selected, the apparatus comprising:

- a scheduler for determining a time of an alarm;
- a mode selector for selecting one of a first reminder alarm mode, a second reminder alarm mode, and a third reminder alarm mode; and
- a controller for generating:
  - in said first reminder alarm mode, a sound medium reminder alarm at the time of the alarm even if said silent mode is selected;
  - in said second reminder alarm mode, the sound medium reminder alarm if the alarm time has passed when the silent mode has been reset to the sound mode; and
  - in said third reminder alarm mode, a silent medium reminder alarm at the time of the alarm if the silent mode has been selected.

2. The apparatus according to claim 1, wherein the sound medium reminder alarm is generated by a speaker.

3. The apparatus according to claim 1, wherein the silent medium reminder alarm is generated by a visual attention-getting device.

4. The apparatus according to claim 3, wherein the silent medium reminder alarm is generated by a light-emitting device.

5. The apparatus according to claim 3, wherein the silent medium reminder alarm is generated by a display device.

6. The apparatus according to claim 1 wherein the silent medium reminder alarm is generated by a mechanical vibrator.

7. A selective call receiver for receiving a selective calling signal and detecting an incoming call, comprising:

- an informer for selectively generating an audible alert and a silent alert;
- a scheduler for determining a reminder alert time at which a reminder alert is to be generated;
- a first mode selector for selecting one of an audible mode and a silent mode, wherein an incoming call causes the audible alert to be generated when the audible mode is selected and the silent alert to be generated when the silent mode is selected;

a second mode selector for selecting one from a first alert mode, a second alert mode, and a third mode alert mode; and a controller for generating the audible alert at the reminder alert time when the first alert mode has been selected even in a state where the silent mode is selected, generating the audible alert at a time when the silent mode is changed to the audible mode after the reminder alert time has passed when the second alert mode has been selected, and generating the silent alert at the reminder alert time when the silent mode and the third alert mode have been selected.

8. The selective call receiver according to claim 7, wherein the audible alert is generated by a speaker.

9. The selective call receiver according to claim 7, wherein the silent alert is generated by a visual device.

10. The selective call receiver according to claim 9, wherein the silent alert is generated by a light-emitting device.

11. The selective calling receiver according to claim 9, wherein the silent alert is generated by a display device.

12. The selective calling receiver according to claim 7, wherein the silent alert is generated by a mechanical vibrator.

13. A method for generating a reminder alarm in a selective call receiver which is selectively set to one of a sound mode and a silent mode, wherein an incoming call causes a sound medium alarm to be generated when the sound mode is selected and a silent medium alarm to be generated when the silent mode is selected, the method comprising the steps of:

determining a time of an alarm by a scheduler program;

selecting one of a first reminder alarm mode, a second reminder alarm mode, and a third reminder alarm mode;

generating a sound medium reminder alarm at the time of the alarm when the first reminder alarm mode has been selected even in a state where the silent mode is selected;

generating the sound medium reminder alarm at a time when the silent mode is changed to the sound mode after the time of the alarm has passed when the second reminder alarm mode has been selected; and generating a silent medium reminder alarm at the time of the alarm when the silent mode and the third reminder alarm mode have been selected.

14. The method according to claim 13, wherein the sound medium reminder alarm is generated by a speaker.

15. The method according to claim 13, wherein the silent medium reminder alarm is generated by a visual attention-getting device.

16. The method according to claim 15, wherein the silent medium reminder alarm is generated by a light-emitting device.

17. The method according to claim 15, wherein the silent medium reminder alarm is generated by a display device.

18. The method according to claim 13, wherein the silent medium reminder alarm is generated by a mechanical vibrator.

19. A pager receiver comprising a scheduler for notifying a user at a preset time, said scheduler comprising:

an audible alarm;

a silent alarm;

scheduling memory for storing an alarm time preset by a user; and a selector for selecting one of an audible mode, a fully-silent mode and a modified-silent module; and a controller connected to said audible alarm, said silent alarm and said selector, wherein in said audible mode, said controller activates said audible alarm at said preset time stored in said scheduling memory, in said fully-silent mode said controller activates said silent alarm at said preset time stored in said scheduling memory; and in said modified-silent mode said controller delays activating said audible alarm when said preset time stored in said scheduling memory has passed until the user selects said audible mode.

* * * * *